(12) United States Patent
Burns

(10) Patent No.: US 6,177,740 B1
(45) Date of Patent: Jan. 23, 2001

(54) INTEGRATED MOTOR AND MOTOR DRIVE UNIT

(75) Inventor: Jeffrey H. Burns, Kokomo, IN (US)

(73) Assignee: Delphi Technologies, Inc., Troy, MI (US)

(*) Notice: Under 35 U.S.C. 154(b), the term of this patent shall be extended for 0 days.

(21) Appl. No.: 09/240,158

(22) Filed: Jan. 29, 1999

(51) Int. Cl.[7] .......................... H02K 11/00; H02K 1/32; H02K 5/00
(52) U.S. Cl. ........................ 310/68 R; 310/64; 310/89
(58) Field of Search .................................. 310/68 R, 64, 310/70 R, 89, 68 B, 68 D, 65, 85; 123/41.31; 361/717; 318/254

(56) References Cited

U.S. PATENT DOCUMENTS

| | | | |
|---|---|---|---|
| 4,557,225 | * | 12/1985 | Sagues et al. ................ 123/41.31 |
| 4,605,986 | * | 8/1986 | Bentz et al. ..................... 361/717 |
| 4,668,898 | * | 5/1987 | Harms et al. .................... 318/254 |
| 4,988,905 | * | 1/1991 | Tolmie, Jr. ...................... 310/68 B |
| 5,491,370 | * | 2/1996 | Schneider et al. ............... 310/54 |
| 5,640,062 | * | 6/1997 | Yockey ........................... 310/68 D |
| 5,814,909 | * | 9/1998 | Yamada et al. .................. 310/64 |
| 5,939,807 | * | 8/1999 | Patyk et al. ..................... 310/89 |

\* cited by examiner

*Primary Examiner*—Nestor Ramirez
*Assistant Examiner*—Guillermo Perez
(74) *Attorney, Agent, or Firm*—Jimmy L. Funke

(57) ABSTRACT

An electric motor and motor drive unit assembly includes a motor assembly having a housing and a motor rotatably coupled within the housing. A power distribution bus is coupled to the housing. The power distribution bus is coupled to an end cap of the motor. A plurality of semiconductor switches are coupled to the power distribution bus. The motor and drive assembly further includes a drive assembly having a case coupled to the power distribution bus. The case is electrically isolated from and is in thermal communication with the power distribution bus. The case has a plurality of openings therethrough. An interconnect circuit board is disposed within the case and is electrically coupled to the power distribution bus through the plurality of openings. A system control board is disposed within the case and is electrically coupled to the interconnect board.

12 Claims, 2 Drawing Sheets

INTEGRATED MOTOR AND MOTOR DRIVE UNIT

TECHNICAL FIELD

The present invention relates generally to electrical motors. More specifically, the present invention relates to an integrated motor and motor drive unit.

BACKGROUND OF THE INVENTION

Electric motors are used in many industries. On automobiles, motors are used in various locations. For example, motors may be used to drive a pump.

Commonly, these motors generally comprise two main components; a motor assembly and a drive assembly. The motor assembly includes the actual rotating motor. The drive assembly includes the drive electronics for controlling the operation of the motor. Commonly, the motor and the drive assembly are two separate components connected by an external cable assembly. There are several disadvantages to a separate drive assembly and motor assembly.

One disadvantage of a separate motor assembly is the external cable assembly. An external cable assembly increases electrical resistance for the system, and may act as an antenna which may both receive and radiate unwanted electromagnetic interference. In fact, the FCC has regulated the electromagnetic radiation emitted from a motor. To prevent electromagnetic interference, a more expensive shielded wire must be used if electromagnetic interference exceeds the FCC regulation.

Another disadvantage to providing a separate drive assembly and motor assembly is the integration of the two separate units into the finished product. Having two separate assemblies increases the space required for a motor and drive unit. Also, the assembly complexity for mounting two components is relatively high.

For automotive applications, motors use a relatively low voltage and draw high currents. This causes the motors to dissipate more power. Some industrial integrated drive motors operate at 110 volts. The high voltage motors draw little current and dissipate small amounts of power. Because of the low power dissipation, organic-based circuit boards for power distribution may be used in such applications. However, in low voltage automotive applications, organic-based circuit boards cannot be used.

SUMMARY OF THE INVENTION

It is therefore one object of the invention to provide an integrated motor and drive unit. It is a further object of the invention to provide an easily assemblable motor and drive unit.

In one aspect of the invention, a motor and motor drive unit assembly includes a motor assembly having a housing and a motor rotatably coupled within the housing. A power distribution bus is coupled to the housing. In a preferred embodiment, the power distribution bus is coupled to an end cap of the motor. A plurality of semiconductor switches are coupled to the power distribution bus. The motor and drive assembly further includes a drive assembly having a case or housing coupled to the power distribution bus. The case is preferably electrically isolated from, and is in thermal communication with, the power distribution bus. The case or housing has a plurality of openings therethrough. An interconnect circuit board is disposed within the case and is electrically coupled to the power distribution bus through the plurality of openings. A system control board is disposed within the case and is electrically coupled to the interconnect board.

One advantage of the invention is the high heat dissipation capabilities. Because the power distribution bus is located between the case and the motor housing, both the motor housing and the case may act as a heat sink. Another advantage of the invention is that the semiconductor switches are coupled directly on the motor eliminating interconnecting wires. Another advantage of the invention is that the shaft position sensors may be mounted directly to the system control board within the case which results in a lower cost assembly.

In a further aspect of the invention, the present invention may be used for more than just a motor. For example, the teachings of the present invention may be applied to a power supply or other power intensive application. In this manner, a power distribution bus such as that described above is coupled between a first thermally conductive member and a second thermally conductive member. The power distribution bus has a plurality of semiconductor switches mounted thereto. The first and second thermally conductive members may, for example, be a heat sink, a circuit board housing for housing electronic control circuitry or other type of housing. The power distribution bus is electrically isolated from the first thermally conductive member and the second thermally conductive member. The power distribution bus is thermally coupled to the first thermally conductive member and the second thermally conductive member to allow heat to be dissipated from the power distribution bus through the first thermally conductive member and the second thermally conductive member.

These and other features and advantages of the present invention will become apparent from the following description of the invention, when viewed in accordance with the accompanying drawings and appended claims.

BEST MODE(S) FOR CARRYING OUT THE INVENTION

Although the invention is described and illustrated in terms of a motor, it will be appreciated that this invention may be used for various types of power circuitry requiring high heat dissipation such as a power supply.

Figure 1:
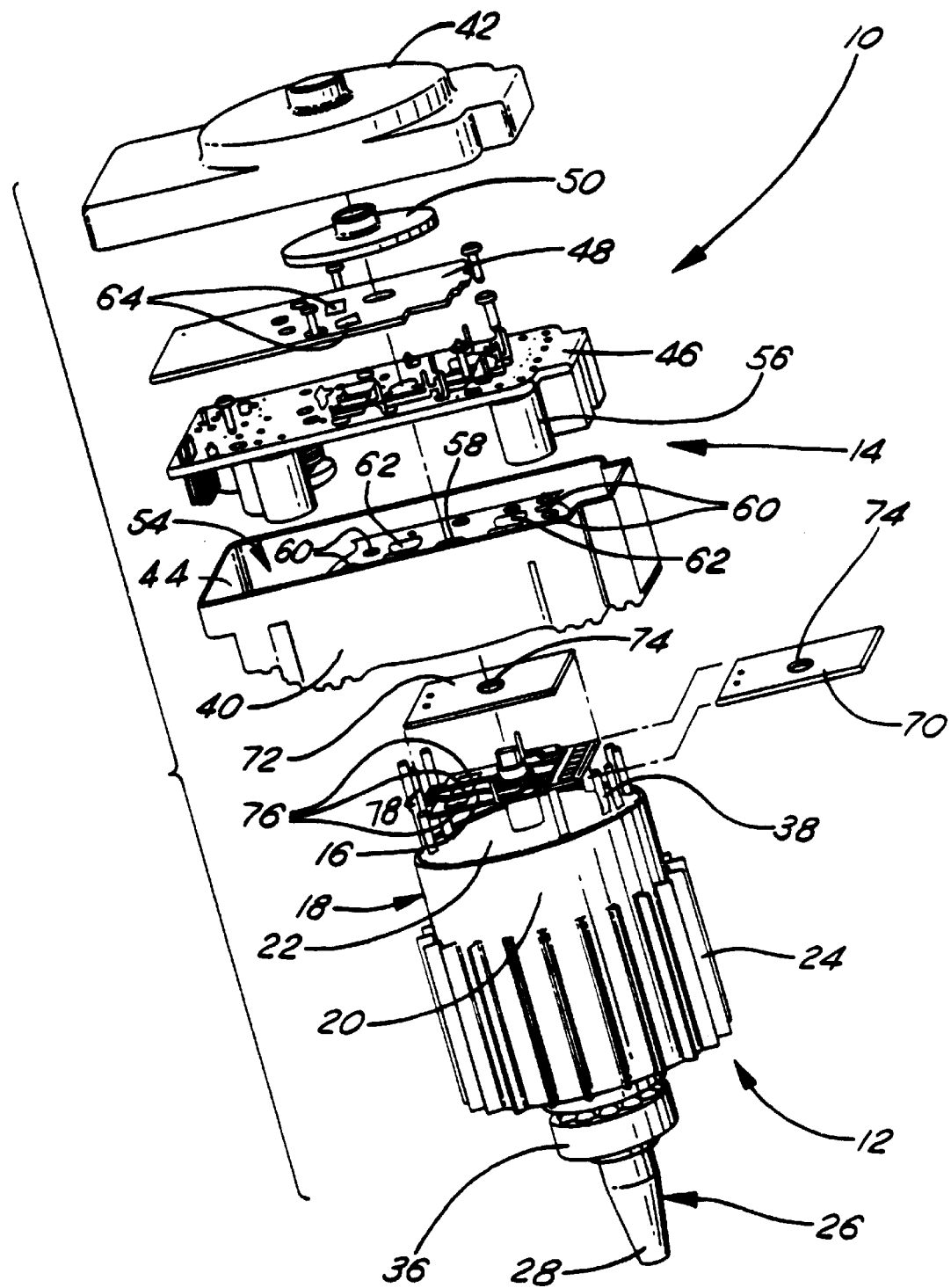
FIG. 1 is an exploded view of a motor and motor drive assembly according to the present invention.
Figure 2:
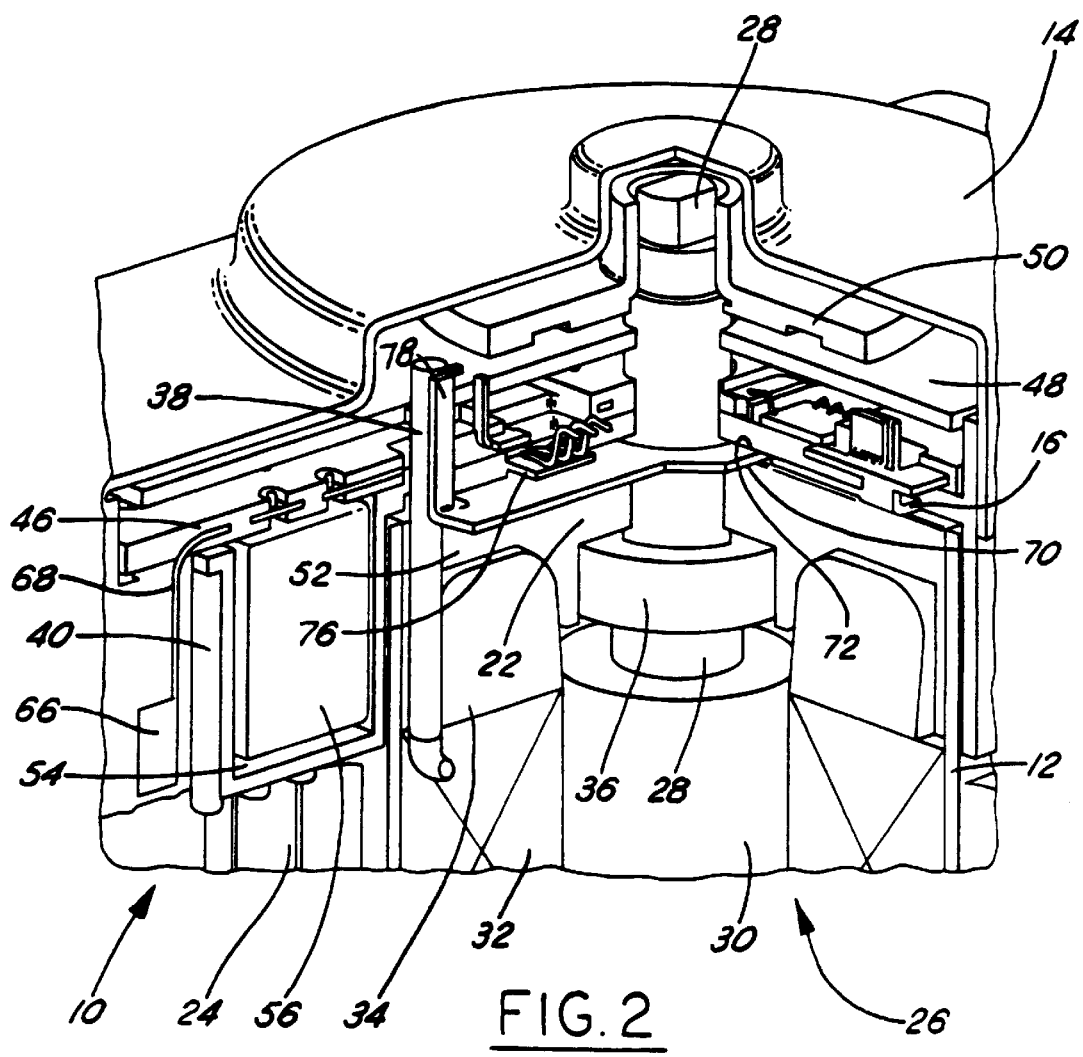
FIG. 2 is a partial cutaway view of a motor and motor drive assembly of FIG. 1.

Referring now to the drawings, a motor and drive assembly unit 10 has a motor assembly 12 and a drive assembly 14 as shown in FIGS. 1 and 2. A power distribution bus 16 is coupled between the motor assembly 12 and drive assembly 14. Motor assembly 12 has a motor housing 18 that is generally comprised of a cylindrical outer sleeve 20 and an end cap 22. Cylindrical outer sleeve 20 may have cooling fins 24 disposed thereon. Housing 18 is preferably thermally conductive providing heat dissipation for motor assembly 12.

Housing 18 encloses a motor 26. Motor 26 has a shaft 28 and a rotor 30 coupled to shaft 28. Within cylindrical outer sleeve 20 is a stator 32 that is comprised of a plurality of windings 34. Bearings 36 are coupled to shaft 28 to position shaft 28 within housing 18. Various suitable bearings would be evident to those skilled in the art. Windings 34 have winding terminations 38 that extend through end cap 22 of housing 18. As will be further described below, winding terminations 38 are used to couple power to windings 34. As will be further described below, winding terminations 38 and threaded fasteners (not shown) may also be used to help secure motor and drive unit assembly 10 together.

Drive assembly 14 has a case 40 and a cover 42 that define a cavity 44 therebetween. Cavity 44 is sized to hold the motor control circuitry such as an interconnect board 46, a control board 48, and an encoder 50. Case 40 is preferably formed from a thermally conductive material to allow heat to be dissipated from the motor and the control circuitry. Case 40 may also have a generally cylindrically shaped recess 52 on the exterior thereof. Recess 52 is sized to receive housing 18 and power distribution bus 16. Case 40 may also have an interior recess 54 to accommodate electronic components of interconnect board 46. For example, interior recess 54 may be sized to accommodate capacitors 56. Recess 52 may have a plurality of apertures for interconnecting with the power distribution bus 16 and with the motor and, more specifically, winding terminations 38 and shaft 28. Case 40 may, therefore, have a shaft aperture 58, winding apertures 60, and switch apertures 62.

Control board 48 may have a plurality of position sensors 64 coupled thereto. Position sensors 64 may, for example, be of the Hall effect type. However, various types of position sensors may be used. Position sensors 64 in combination with encoder wheel 50 provide feedback to the remaining circuitry on control board 48 and interconnect board 46 as to the position of the shaft 28.

A connector 66 may be coupled to case 40 for providing external power to the motor and drive unit assembly 10. Connector 66 has a copper strip 68 that extends between connector 66 and interconnect board 46. From the interconnect board 46, power is distributed to the control circuitry and to motor windings 34.

Power distribution bus 16 is generally formed of an electrically and thermally conductive material such as copper. Power distribution bus 16 is coupled between end cap 22 and case 40. Because case 40 and end cap 22 are preferably thermally conductive, they are also most likely metallic and thus electrically conductive. Consequently, some means for electrically isolating power distribution bus 16, case 40, and end cap 22 should be provided. One means for electrically isolating case 40 and end cap 22 is placing a coupling material such as a non-electrically conductive film therebetween. A first layer of film 70 and a second layer of film 72 are provided between power distribution bus 16 and end cap 22, and between power distribution bus 16 and case 40, respectively. Films 70, 72 are preferably sized to cover the area of power distribution bus 16. Appropriate apertures may be provided in films 70, 72 to allow winding terminations 38 and shaft 28 to pass therethrough. Films 70, 72 are also thermally conductive so that any heat in power distribution bus 16 is coupled to case 40 and end cap 22 and ultimately to housing 18. Suitable materials for films 70, 72 include but are not limited to mica, epoxy, thermal grease, or a double-sided tape.

Power distribution bus 16 has a plurality of semiconductor switches 76 mounted thereto. Semiconductor switches 76 may, for example, be MOSFETS, switching diodes or other switching devices commonly known in the art. Semiconductor switches 76 ultimately control the power supplied to windings 34 and ultimately control the operating parameters of the motor such as motor speed.

Power distribution bus 16 has a plurality of tabs 78 integrally formed with power distribution bus 16. Tabs 78 in the preferred embodiment are formed coextensively with power distribution bus 16 and extend in an axial direction through case 40 and into cavity 44. Tabs 78 are formed adjacent to a respective winding termination 38 which also extends into cavity 44. Tabs 78 and winding terminations 38 are electrically coupled by crimping, welding, soldering, or other coupling means. The coupled tabs 78 and winding terminations 38 may be electrically coupled to interconnect board 46 and control board 48.

In operation, motor assembly 12 is assembled in a conventional manner. Winding terminations 38, however, extend through end cap 22. Also, shaft 28 extends through end cap 22. Film 70 is then positioned on end cap 22 or coupled to power distribution bus 16 so that power distribution bus 16 is electrically isolated and thermally coupled to housing 18. Case 40 is positioned so that recess 52 fits over cylindrical outer sleeve 20 and power distribution bus 16. Tabs 78, winding terminations 38, and shaft 28 will then extend through their respective apertures and into cavity 44. Winding terminations 38 and tabs 78 are electrically coupled together and to interconnect board 46. Control board 48 is also coupled to interconnect board 46 within cavity 44. The encoder wheel 50 is then coupled to shaft 28 adjacent to position sensors 64. The motor and drive unit assembly may be held together by threaded fasteners (not shown). Cover 42 is coupled to case 40 and is used to enclose cavity 44, thus the complete motor and drive unit assembly 10 is coupled together. During operation of the motor, heat is generated by semiconductor switches 76. Because of the thermal coupling between housing 18 and case 40, heat is transferred to case 40 and end cap 22. The heat from end cap 22 is coupled to cylindrical outer sleeve 20 and ultimately to cooling fins 24. Of course, each of these components dissipates heat.

The present invention also applies to other types of electrical machinery using power distribution. For example, case 40 could be the case of a power supply while housing 18 could be the heat sink of a power supply. Power distribution bus 16 may be coupled to case 40 and the housing 18 in a similar manner to that described above so that heat may be dissipated on both sides of power distribution bus 16.

While the best mode for carrying out the present event has been described in detail, those familiar with the art to which this invention relates will recognize various alternative designs and embodiments for practicing the invention as defined by the following claims:

What is claimed is:

1. A motor and motor drive unit assembly comprising:
    a motor assembly having,
        a housing;
        a motor rotatably coupled within the housing;
        a power distribution bus coupled to said housing;
        a plurality of semiconductor switches coupled to said power distribution bus;
    a drive assembly having,
        a case thermal-conductively and electrically non-conductively coupled to said power distribution bus, said case having a plurality of openings therethrough;
        an interconnect circuit board disposed within said case and electrically coupled to said power distribution bus through said plurality of openings.

2. A motor and motor drive unit assembly as recited in claim 1 further comprising a system control board disposed within said case and electrically coupled to said interconnect board.

3. A motor and motor drive unit assembly as recited in claim 2 further comprising a plurality of sensors coupled to said system control board and an encoder wheel disposed adjacent to said sensors within said case.

4. A motor and motor drive unit assembly as recited in claim 1 wherein said case has a plurality of winding apertures, said motor assembly comprising winding terminations extending through a respective winding aperture.

5. A motor and motor drive unit assembly as recited in claim 1 wherein said power distribution bus comprises tabs corresponding to said winding openings, and electrically coupled to said winding terminations.

6. A motor and motor drive unit assembly as recited in claim 1 further comprising a first coupling material disposed between said housing and said power distribution bus, said first coupling material being thermally conductive and electrically non-conductive.

7. A motor and motor drive unit assembly as recited in claim 1 further comprising a second coupling disposed between said case and said power distribution bus, said second material being thermally conductive and electrically non-conductive.

8. A motor and motor drive unit assembly as recited in claim 1 wherein said case further comprises a cover.

9. A motor and motor drive unit assembly as recited in claim 1 wherein said motor housing comprises an outer sleeve having an end cap.

10. A motor and motor drive unit assembly as recited in claim 9 wherein said housing has a cylindrical recess sized to receive said outer sleeve.

11. A motor and motor drive unit assembly as recited in claim 1 wherein said case has a plurality of winding apertures, said motor assembly comprises winding terminations extending through a respective winding aperture.

12. A motor and motor drive unit assembly as recited in claim 11 wherein said power distribution bus comprises tabs corresponding to said winding apertures.

* * * * *